United States Patent
Halmari et al.

(10) Patent No.: US 11,125,331 B2
(45) Date of Patent: Sep. 21, 2021

(54) LINER LOCK FLANGE FOR A PISTON PUMP

(71) Applicant: Cameron International Corporation, Houston, TX (US)

(72) Inventors: Jaakko Jalmari Halmari, Houston, TX (US); David Scott Crew, Jr., Houston, TX (US); Jeffrey Boardman Pruitt, Humble, TX (US); Ban Tran, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/100,108

(22) Filed: Aug. 9, 2018

(65) Prior Publication Data

US 2020/0049144 A1 Feb. 13, 2020

(51) Int. Cl.
*F16J 10/04* (2006.01)
*F04B 53/16* (2006.01)

(52) U.S. Cl.
CPC ............. *F16J 10/04* (2013.01); *F04B 53/168* (2013.01)

(58) Field of Classification Search
CPC ................................. F04B 53/168; F16J 10/04
See application file for complete search history.

(56) References Cited

U.S. PATENT DOCUMENTS

| 3,786,729 | A  | * | 1/1974 | Rizzone ................ F04B 53/162 92/171.1 |
| 6,209,445 | B1 | * | 4/2001 | Roberts, Jr. ........... F04B 53/168 92/128 |
| 10,041,490 | B1 | * | 8/2018 | Jahnke .................. F04B 53/168 |
| 10,246,955 | B2 |   | 4/2019 | Berthaud et al. |
| 10,280,910 | B2 |   | 5/2019 | Berthaud et al. |
| 2005/0089427 | A1 |   | 4/2005 | Riley et al. |
| 2006/0123616 | A1 |   | 6/2006 | Aday et al. |
| 2011/0236238 | A1 |   | 9/2011 | Cordes et al. |
| 2018/0010601 | A1 |   | 1/2018 | Berthaud et al. |

FOREIGN PATENT DOCUMENTS

CN 201827066 U 5/2011

* cited by examiner

*Primary Examiner* — F Daniel Lopez

(57) ABSTRACT

A piston pump includes a frame, a housing configured to be coupled to the frame via a fastener, an annular liner defining a chamber configured to receive a piston of the piston pump, and an annular liner lock flange circumferentially surrounding the annular liner. The annular liner lock flange includes a radially-extending portion configured to be positioned within a respective counterbore of the frame and a respective counterbore of the housing while the housing is coupled to the frame via the fastener to block relative movement between the liner lock flange, the frame, and the housing.

12 Claims, 5 Drawing Sheets

LINER LOCK FLANGE FOR A PISTON PUMP

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural resources, such as oil and gas, are used as fuel to power vehicles, heat homes, and generate electricity, in addition to various other uses. Once a desired resource is discovered below the surface of the earth, drilling and production systems are often employed to access and extract the resource. These systems may be located onshore or offshore depending on the location of the desired resource. Further, such systems may include a wide variety of components, such as various casings, fluid conduits, valves, pumps, and the like, that facilitate extraction of the resource from a well during drilling or extraction operations. For example, a mud pump system may be utilized to pump drilling fluid (e.g., mud) from surface tanks into a drill pipe. However, some mud pump systems may be difficult to maintain and/or repair, thereby resulting in increased downtime during maintenance and/or repair operations.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments are generally directed to pump systems for use within a drilling and production system. Certain embodiments include a pump system having a liner lock flange (e.g., annular flange) designed to facilitate alignment between a piston liner (e.g., annular liner) and a piston, and to also enable replacement of a wear plate (e.g., annular plate) without removal of the liner lock flange. The disclosed embodiments may advantageously provide a compact pump system, may reduce wear on components of the pump system, and/or may facilitate maintenance and/or repair of the components of the pump system, for example. It should be appreciated that the liner lock flange that is used as part of the pump system disclosed herein may be adapted for use with various types of equipment, such as any piston pump system, including but not limited to mud pump systems.

Figure 1:
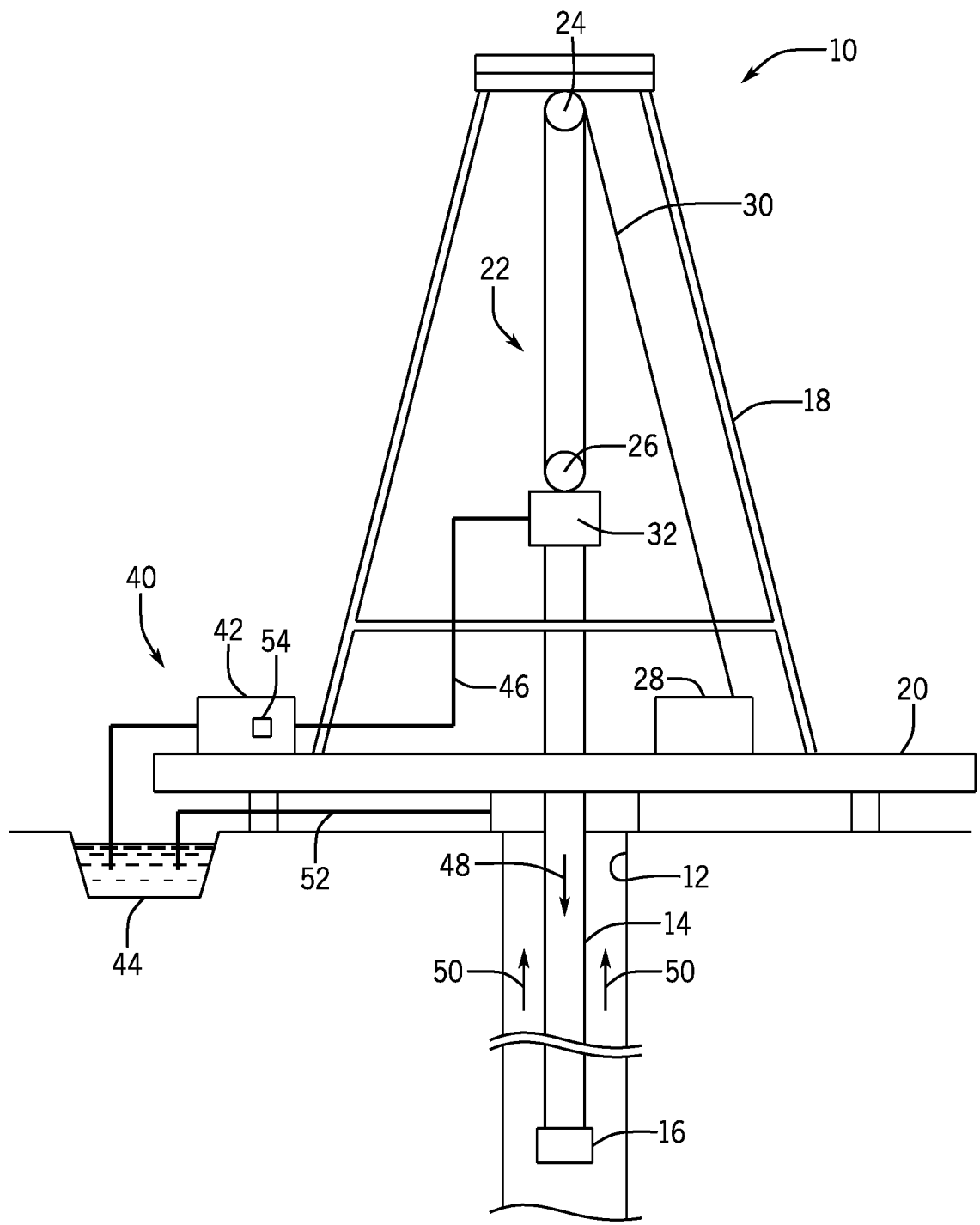
FIG. 1 is a schematic diagram of a portion of a drilling and production system, in accordance with an embodiment of the present disclosure.

With the foregoing in mind, FIG. 1 is a schematic diagram of a portion of a drilling and production system 10, in accordance with an embodiment of the present disclosure. As shown, a wellbore 12 is formed in a subsurface formation, and a drill string 14 is suspended within the wellbore 12. The drill string may include a drill bit 16 that cuts through the subsurface formation to form or to drill the wellbore 12. The system 10 includes a mast 18 positioned on a drill floor 20 and over the wellbore 12. A hoisting system 22 includes a crown block 24, a traveling block 26, and a drawworks system 28. A cable 30 (e.g., wire) extends from the drawworks system 28 and couples the crown block 24 to the traveling block 26. In the illustrated embodiment, a top drive 32 is coupled to the traveling block 26. The top drive 32 rotates the drill string 14 as the hoisting system 22 raises and lowers the top drive 32 and the drill string 14 relative to the drill floor 20 to facilitate drilling of the wellbore 12. It should be appreciated that hoisting systems having various other components (e.g., swivels) and configurations may be utilized in the system 10.

The system 10 also includes a pump system 40 having a pump 42 that pumps a drilling fluid (e.g., mud; water-based, oil-based, or synthetic-based fluid) from a tank 44 to an interior channel in the drill string 14. For example, the pump 42 may pump the drilling fluid from the tank 44, through a fluid conduit 46 (e.g., pipe), through a port in the top drive 32, and into the interior channel in the drill string 14, as shown by arrow 48. The drilling fluid may exit the drill string 14 via ports in the drill bit 16, and then circulate upwardly through an annulus between an outer surface (e.g., annular surface) of the drill string 14 and an inner surface (e.g., annular surface) that defines the wellbore 12, as shown by arrows 50. The drilling fluid may then return to the tank 44 via a fluid conduit 52 (e.g., pipe). The drilling fluid may lubricate the drill bit 16, may carry formation cuttings toward the surface, and/or may maintain hydrostatic pressure within the wellbore 12. As discussed in more detail below, the pump 42 may include a liner assembly 54 (e.g., piston liner assembly) with various features that facilitate operation of the pump 42, as well as maintenance of the pump 42, for example. While FIG. 1 illustrates a land-based drilling and production system 10 to facilitate discussion, it should be understood that the disclosed embodiments may be adapted for use within an offshore drilling and production system.

Figure 2:
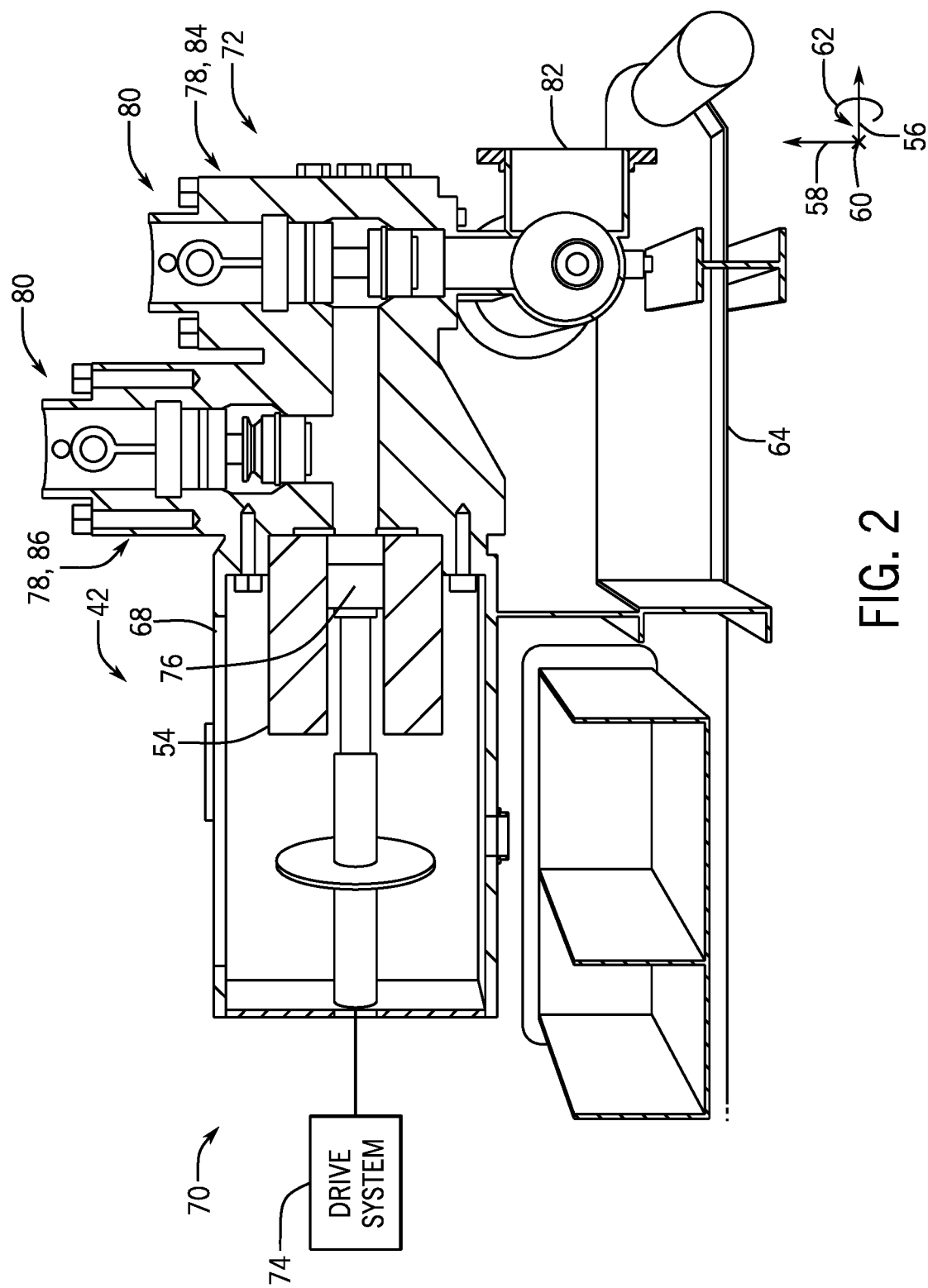
FIG. 2 is a side view of a pump that may be used in the drilling and production system of FIG. 1, in accordance with an embodiment of the present disclosure.

FIG. 2 is a cross-sectional side view of the pump 42 that may be used in the drilling and production system 10 of FIG. 1. To facilitate discussion, the pump system 42 and its components may be described with reference to an axial axis or direction 56, a radial axis or direction 58, a lateral axis or direction 60, and a circumferential axis or direction 62.

In the illustrated embodiment, the pump 42 is supported on a skid 64 (e.g., support structure) and includes a frame 68 (e.g., main frame) that is coupled to the skid 64. The pump 42 extends from a power end portion 70 to a fluid end portion 72. The power end portion 70 may include components of a drive system 74 (e.g., motor, gears, and/or crankshaft assembly that coverts rotation into reciprocating motion to drive one or more pistons 76 back and forth along the axial axis 56). The fluid end portion 72 may include the one or more pistons 76, one or more modules 78 (e.g., housings) surrounding and/or supporting one or more valves 80 (e.g., one-way check valves), and one or more fluid inlets 82 (e.g., suction manifold) through which the drilling fluid is drawn (e.g., suctioned) into the one or more modules 78 to be pumped (e.g., discharged) toward the drill string 14 (FIG. 1). The frame 68 surrounds (e.g., houses or covers) the one or more pistons 76 and associated components (e.g., piston rod), and the frame 68 is coupled to the one or more modules 78. As shown in the illustrated embodiment, each piston 76 is associated with a suction module 84 and a discharge module 86 that are coupled to one another. In operation, the reciprocating motion of the piston 76 draws the drilling fluid, for example mud, in through a corresponding fluid inlet 82 and a corresponding suction module 84 and then forces the mud out through a corresponding fluid outlet or discharge manifold extending from a corresponding discharge module 86 (e.g., positioned out of view behind the discharge module 84 along the lateral axis 60 in FIG. 2).

Figure 3:
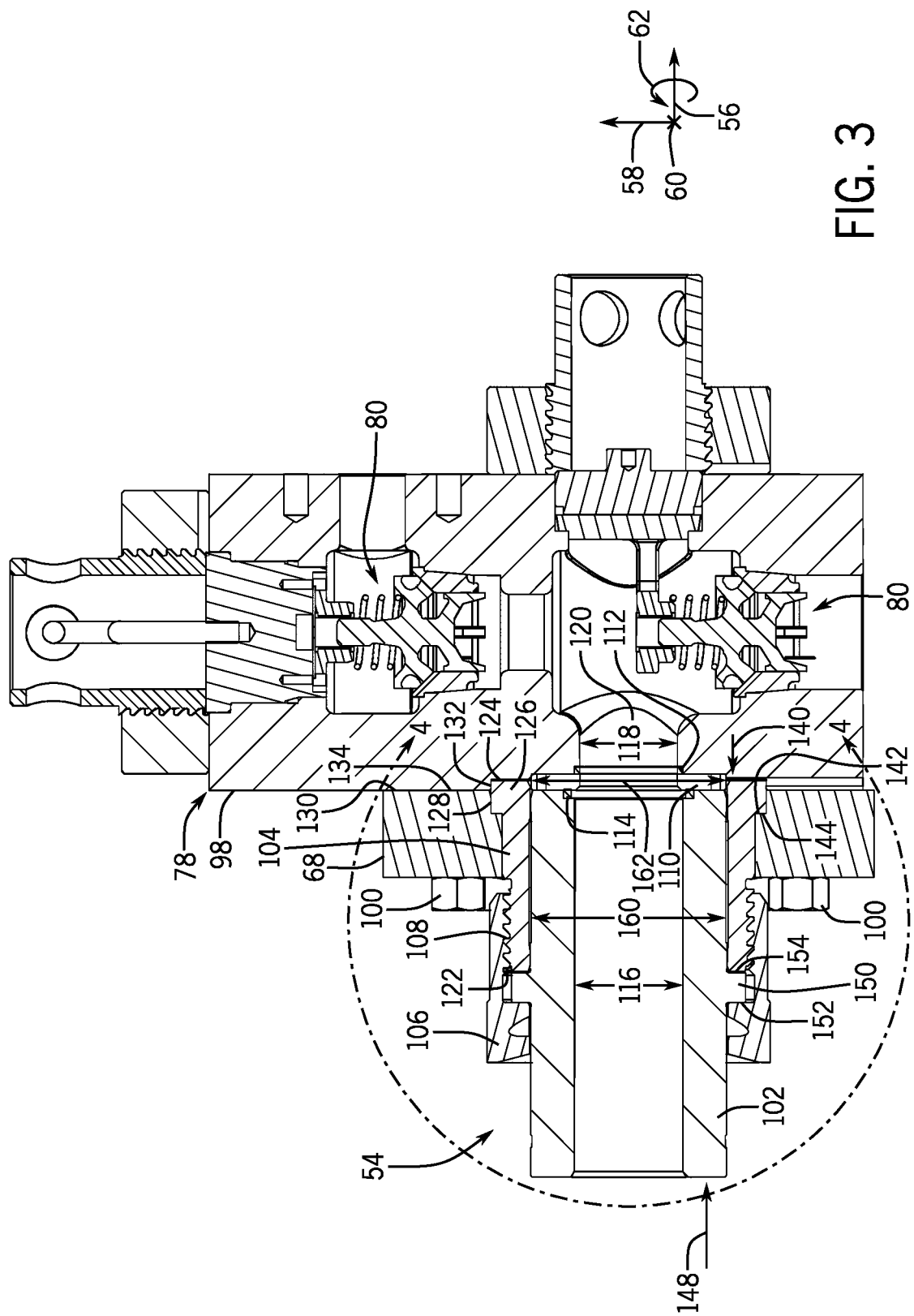
FIG. 3 is a side view of a liner assembly that may be used in the pump of FIG. 2, in accordance with an embodiment of the present disclosure.
Figure 4:
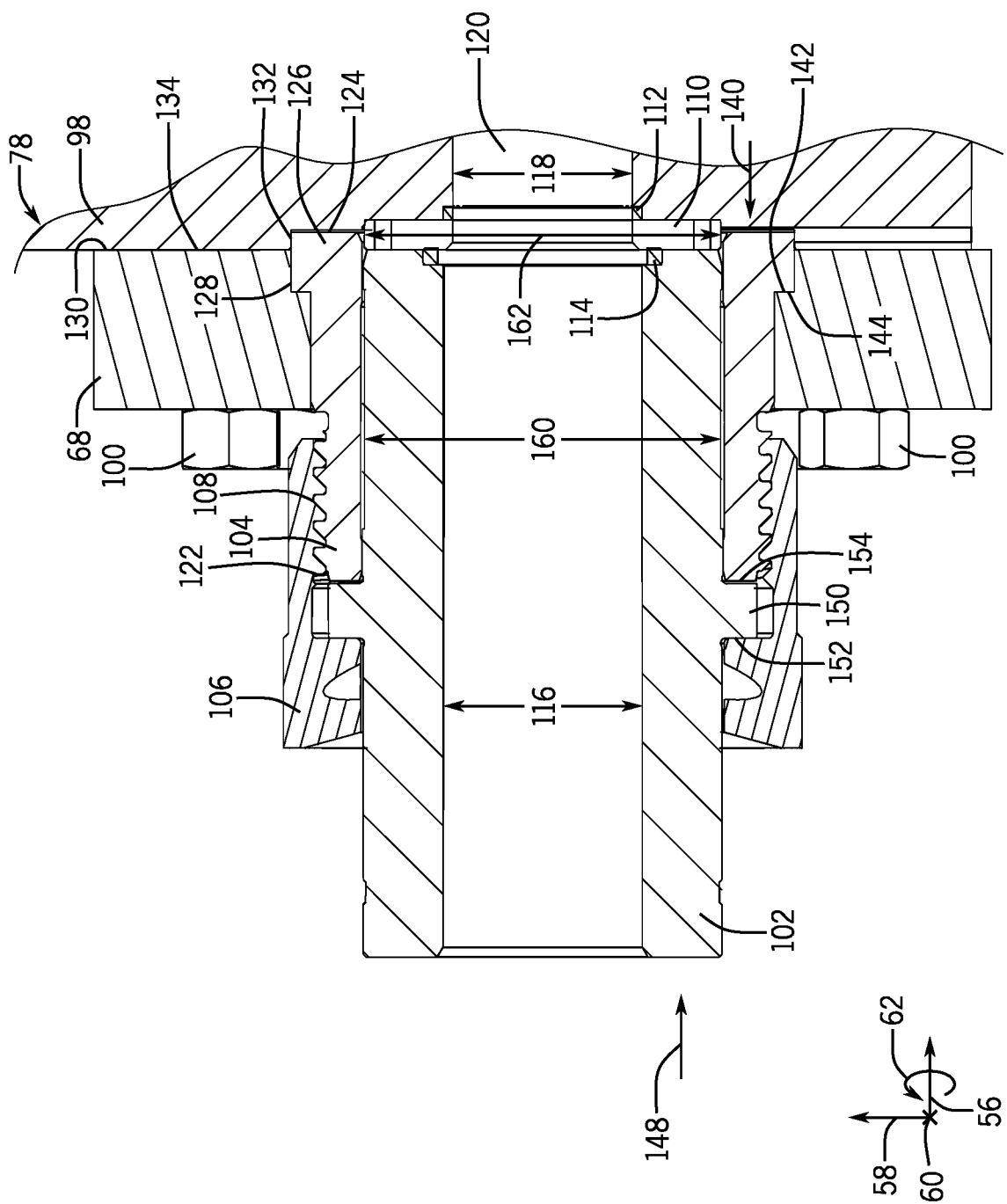
FIG. 4 is a side view of the liner assembly taken within line 4-4 of FIG. 3, in accordance with an embodiment of the present disclosure.

In the illustrated embodiment, the fluid end portion 72 also includes one or more liner assemblies 54, and each of the one or more liner assemblies 54 circumferentially surrounds a respective one of the one or more pistons 76. One liner assembly 54 is shown schematically in FIG. 2 to illustrate its position relative to other components of the pump 42, and details of the liner assembly 54 are shown in FIGS. 3 and 4. In general, the liner assembly 54 may include a liner defining a chamber through which the piston 76 moves, as well as a liner lock flange and associated liner lock nut that together retain the liner in its position proximate to a respective one of the one or more modules 78.

In the cross-section of FIG. 2, only one piston 76 and its corresponding modules 78 and corresponding liner assembly 54 are shown. However, it should be appreciated that the pump 42 may include multiple pistons 76 and corresponding modules 78 and liner assemblies 54 distributed along the lateral axis 60 (e.g., side-by-side along the lateral axis 60). Furthermore, while each piston 76 has two corresponding modules 78 (e.g., the suction module 84 and the discharge module 86) in FIG. 2, it should be appreciated that each piston 76 may have only one corresponding module 78 having a different valve structure to enable suction and discharge functionality.

FIG. 3 is a side view of the liner assembly 54 that may be used in the pump 42 (FIG. 2), and FIG. 4 is a side view of the liner assembly 54 taken within line 4-4 of FIG. 3, in accordance with an embodiment of the present disclosure. In FIG. 3, only a portion of the frame 68 is shown to facilitate discussion and to simplify the drawing. Furthermore, the illustrated module 78 includes a different valve structure than the modules 78 shown in FIG. 2, but the valves 80 operate in the same manner to suction and discharge the drilling fluid.

As shown in FIGS. 3 and 4, the frame 68 is coupled to the module 78 via one or more fasteners 100 (e.g., threaded fasteners, such as bolts, studs, nuts). The liner assembly 54 includes a liner 102 (e.g., annular liner) defining a chamber through which the piston 76 (FIG. 2) moves. The liner assembly 54 also includes a liner lock flange 104 (e.g., annular flange) and a liner lock nut 106 (e.g., annular nut) that together retain the liner 102 in its position proximate to the module 78. In the illustrated embodiment, the liner lock flange 104 and the liner lock nut 106 are coupled to one another via a threaded interface 108, although other coupling interfaces (e.g., key-slot interface, j-slot, quarter-turn) may be utilized.

The liner assembly 54 may include a wear plate 110 (e.g., annular wear plate or sleeve), a wear plate seal 112 (e.g., annular seal), and/or a liner seal 114 (e.g., annular seal). As shown, the wear plate 110 is positioned between the module 78 and the liner 102 along the axial axis 56. In some embodiments, this may be a high-wear region due at least in part to a difference between an inner diameter 116 of the liner 102 and an inner diameter 118 of a bore 120 of the module 78 (e.g., the inner diameter 116 is greater than the inner diameter 118). The wear plate seal 112 seals against and is positioned between the wear plate 110 and the module 78 along the axial axis 56. The liner seal 114 seals against and is positioned between the wear plate 110 and the liner 102 along the axial axis 56. When assembled, the liner lock flange 104 may circumferentially surround at least a portion of the wear plate 110.

The liner assembly 54 is designed to facilitate alignment between the liner 102 and the piston 76 (FIG. 1), and also to enable replacement of the wear plate 110 (as well as the liner seals 114, 116) without removal of the liner lock flange 104. As shown, the liner lock flange 104 extends from a first end 122 that couples to the liner lock nut 106 to a second end 124 that includes a radially-extending flange 126 (e.g., annular flange or portion). A portion of the radially-extending flange 126 is positioned within a counterbore 128 (e.g., annular recess) formed in a module-facing surface 130 (e.g., housing-facing or axially-facing surface) of the frame 68. Another portion of the radially-extending flange 126 is positioned within a counterbore 132 (e.g., annular recess) formed in a frame-facing surface 134 (e.g., axially-facing surface) of the module 78. When the frame 68 is coupled to the module 78 via the fasteners 100, the radially-extending flange 126 within the counterbores 128, 132 is trapped between the frame 68 and the module 78, thereby blocking movement of the liner lock flange 104 relative to the frame 68 and the module 78. It should be appreciated that the liner lock nut 106 may be rotated to drive the liner 102 toward the liner lock flange 104, thereby tightening the fit or connection between the various components (e.g., between the liner 102, the liner lock flange 104, the module 78).

To assemble the liner lock flange 104 within the pump 42 (FIG. 1), the liner lock flange 104 may be inserted into an opening (e.g., bore) defined by the frame 68 from a module-facing side (e.g., housing-facing side) of the frame 68, as shown by arrow 140. The liner lock flange 104 and the frame 68 may be moved toward one another along the axial axis 56 until a frame-engaging surface 142 (e.g., axially-facing surface) of the radially-extending flange 126 engages a flange-engaging surface 144 of the frame 68. The frame 68 may then be coupled to the module 78 via the threaded fasteners 100, and the position of the radially-extending flange 126 in both counterbores 128, 132 assists in alignment between the frame 68 and the module 78.

The other components of the liner assembly 54 may then be assembled. In particular, the components may be inserted through the liner lock flange 104 from a piston-facing side of the frame 68 (e.g., opposite from the module-facing side of the frame 68), as shown by arrow 148. For example, the wear plate seal 112 may be inserted and positioned within the module 78, then the wear plate 110 may be inserted and positioned against the module 78, then the liner seal 114 may be inserted and positioned into a groove within the liner 102, then the liner 102 may be inserted and positioned against the wear plate 110. Subsequently, the liner lock nut 106 may be coupled to (e.g., threaded onto) the liner lock flange 104. As shown, the liner 102 includes a radially-extending liner flange 150 (e.g., annular flange). When the liner lock nut 106 is coupled to the liner lock flange 104, the radially-extending liner flange 150 is positioned between the liner lock nut 106 and the liner lock flange 104 along the axial axis 56. In particular, an axially-facing surface 152 of the liner lock nut 106 and an axially-facing surface 154 at the first end 122 of the liner lock flange 104 each engage the radially-extending liner flange 150 and block movement of the liner 102 relative to the liner lock nut 106 and the liner lock flange 104. It should be appreciated that the liner 102 may not include the liner flange 105, but instead the liner lock nut 106 may extend to and engage an end of the liner 102 to block movement of the liner 102 relative to the liner lock nut 106 and the liner lock flange 104. To replace the liner lock flange 104, the fasteners 100 are loosened to separate the module 78 from the frame 68, and then the liner lock flange 104 can be moved out of the frame 68 (e.g., by pulling the liner lock flange in a direction opposite arrow 140). Another liner lock flange 104, and the other components of the liner assembly 54, can then be assembled in the manner set forth above.

In operation, the piston 76 (FIG. 2) moves through the liner 102 along the axial axis 56 to pump the drilling fluid through the module 78. The disclosed embodiments enable the liner 102 to remain in its position tightly against the wear plate 110, and enables the wear plate 110 to remain in its position tightly against the module 78 during operation of the pump 42 (FIG. 2) without any fasteners (e.g., threaded fasteners, such as bolts) coupling the liner lock flange 104 to the module 78 and without any fasteners (e.g., threaded fasteners, such as bolts) coupling the liner lock flange 104 to the frame 68. Thus, the liner lock flange 104 may be devoid of openings to receive fasteners. The lack of such fasteners provides a small, light-weight pump 42 (FIG. 2) with fewer parts compared to some existing drilling fluid pumps such as mud pumps or slurry pumps.

Furthermore, the disclosed embodiments enable replacement of the liner 102, the wear plate 110, the wear seal 112, and/or the liner seal 114 without removing the liner lock flange 104 (e.g., without separating the liner lock flange 104 from the frame 68 and/or the module 78). The liner 102, the wear plate 110, the wear seal 112, and/or the liner seal 114 are subject to wear and may need to be replaced relatively frequently (e.g., compared to the liner lock flange 104), and this configuration enables efficient replacement of these high-wear components without removing the liner lock flange 104 or altering alignment between the frame 68 and the module 78 (e.g., since the liner lock flange 104, the frame 68, and the module 78 are not separated from one other during replacement of the liner 102, the wear plate 110, the wear seal 112, and/or the liner seal 114). For example, the liner 102, the wear plate 110, the wear seal 112, and/or the liner seal 114 can be removed by uncoupling the liner lock nut 106 from the liner lock flange 104, and subsequently pulling the liner 102, the wear plate 110, the wear seal 112, and/or the liner seal 114 through the liner lock flange 104 in a direction opposite the arrow 148. As shown, the liner lock flange 104 includes an inner diameter 160 that is greater than an outer diameter 162 of the wear plate 110, and the inner diameter 160 also accommodates removal of the seals 112, 114 and the liner 102.

The disclosed embodiments enable a tight fit (e.g., press fit) between the liner lock flange 104 and the frame 68 and/or between the liner lock flange 104 and the module 78 because the liner lock flange 104 does not need to be separated from the frame 68 and/or the module 78 during regular maintenance operations to replace the liner 102, the wear plate 110, the wear seal 112, and/or the liner seal 114. In contrast, some existing liner lock flanges 108 must be removed or separated from the frame 68 and/or the module 78 (e.g., by uncoupling threaded fasteners that hold the liner lock flange 104 to the frame 68 and/or to the module 78) to replace the liner 102, the wear plate 110, the wear seal 112, and/or the liner seal 114, and as a result, the parts may generally have relatively loose fits to assist with loosening the fasteners and the like. The tight fit in the present embodiments maintains alignment between the liner 102 and the piston 76 (FIG. 2), thereby reducing wear on the liner 102 and the piston 76 (FIG. 2) and extending component life.

Figure 5:
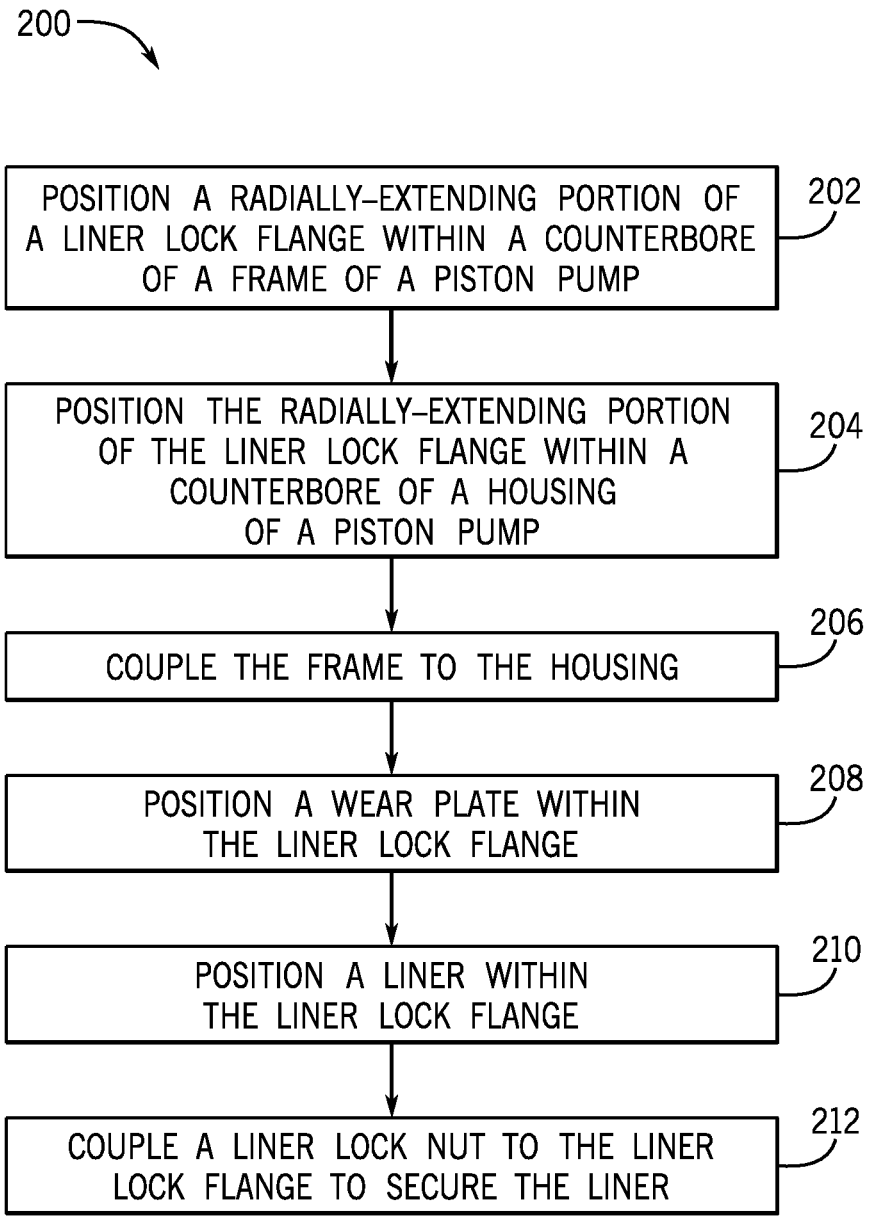
FIG. 5 is a method of assembling a portion of the pump of FIG. 2, in accordance with an embodiment of the present disclosure.

FIG. 5 is a method 200 of assembling a portion of the pump 42 (FIG. 2). The method 200 includes various steps represented by blocks. Although the flow chart illustrates the steps in a certain sequence, it should be understood that the steps may be performed in any suitable order and certain steps may be carried out simultaneously, where appropriate. Additionally, steps may be added to or omitted from of the method 200. The discussion of the method 200 refers to certain components that are described and illustrated in FIGS. 1-4.

In step 202, the radially-expanded portion 126 of the liner lock flange 104 is positioned within the counterbore 128 of the frame 68. As discussed above, the liner lock flange 104 may be inserted into an opening defined by the frame 68 from the module-facing side of the frame 68, as shown by arrow 140. The liner lock flange 104 and the frame 68 may be moved toward one another along the axial axis 56 until the frame-engaging surface 142 of the radially-extending flange 126 engages the flange-engaging surface 144 of the frame 68.

In step 204, the radially-extending portion 126 of the liner lock flange 104 is aligned with and positioned within the counterbore 132 of the module 78. In step 206, the frame 68 may then be coupled to the module 78 (e.g., via the threaded fasteners 100). The position of the radially-extending flange 126 in both counterbores 128, 132 assists in alignment between the frame 68 and the module 78.

In step 208, once the liner lock flange 104 is secured to the frame 68 and the module 78, the wear plate 110 may be inserted through the liner lock flange 104 to a position against the module 78. In step 210, the liner 102 may be inserted through the liner lock flange 104 to a position against the wear plate 110. In step 212, the liner lock nut 106 may then be coupled to the liner lock flange 104 to secure the liner 102 and block movement of the liner 102 relative to the liner lock flange 104 and relative to the liner lock nut 106. As noted above, the liner 102, the wear plate 110, the wear seal 112, and/or the liner seal 114 may be removed through the liner lock flange 104 without separating the liner lock flange 104 from the frame 68 or the module 78.

The pump 42 disclosed herein is merely exemplary, and it should be appreciated that various combinations and arrangements of the features shown and described with respect to FIGS. 1-4 are envisioned. Indeed, any of the features and components of FIGS. 1-5 may be utilized together and/or combined in any suitable manner. Furthermore, the liner assembly 54 and some or all of the components therein may be used in any of a variety of piston pump systems.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A piston pump, comprising:
a frame defining a first counterbore;
a housing configured to be coupled to the frame via a fastener, the housing defining a second counterbore;
an annular liner defining a chamber configured to receive a piston of the piston pump; and
an annular liner lock flange circumferentially surrounding the annular liner and comprising a radially-extending portion configured to be positioned within the first counter bore and the second counterbore, wherein the first counterbore and the second counterbore are aligned so that the radially-extending portion is trapped between and the housing.

2. The piston pump of claim 1, comprising an annular liner lock nut configured to couple to the annular liner lock flange.

3. The piston pump of claim 2, wherein the annular liner lock flange and the annular liner lock nut are configured to engage a radially-extending liner portion of the annular liner to block movement of the annular liner relative to the annular liner lock flange and relative to the annular liner lock nut.

4. The piston pump of claim 1, comprising an annular wear plate configured to be positioned between the annular liner and the housing along an axial axis of the piston pump, wherein the annular wear plate is movable through the annular liner lock flange.

5. The piston pump of claim 4, wherein the annular liner lock flange comprises a first inner diameter and the annular wear plate comprises a second outer diameter that is less than the first inner diameter.

6. The piston pump of claim 4, wherein the annular liner lock flange is configured to circumferentially surround at least a portion of the annular wear plate when the piston pump is assembled.

7. The piston pump of claim 1, wherein the annular liner lock flange is devoid of openings to receive fasteners.

8. The piston pump of claim 1, wherein the housing surrounds one or more valves that facilitate pumping fluid through the piston pump, and the frame surrounds the piston and a piston rod coupled to the piston.

9. A method of assembling a piston pump, comprising:
positioning a radially-expanded portion of an annular liner lock flange within a counterbore of a frame;
positioning the radially-expanded portion of the annular liner lock flange within a counterbore of a housing; and
subsequently coupling the frame to the housing using a fastener, thereby trapping the radially-expanded portion of the annular liner lock flange between the housing and the frame and blocking movement of the annular liner lock flange relative to the housing and the frame.

10. The method of claim 9, wherein positioning the radially-expanded portion of the annular liner lock flange within the counterbore of the frame comprises inserting the annular liner lock flange into an opening defined by the frame from a housing-facing side of the frame.

11. The method of claim 9, inserting an annular wear plate through the annular liner lock flange to position the annular wear plate against the housing after coupling the frame and the housing to one another.

12. The method of claim 9, inserting an annular liner through the annular liner lock flange after coupling the frame and the housing to one another, and subsequently coupling an annular liner lock nut to the annular liner lock flange, wherein the annular liner lock flange and the annular liner lock nut engage the annular liner to block movement of the annular liner relative to the annular liner lock nut and relative to the annular liner lock flange.

* * * * *